P. J. BERNARD.
LEVEL.
APPLICATION FILED NOV. 7, 1908.

920,718.

Patented May 4, 1909.

Witnesses:
Joe. P. Wahler.
C. Bradway.

Inventor
Peter J. Bernard
By Victor J. Evans,
Attorney

UNITED STATES PATENT OFFICE.

PETER J. BERNARD, OF UNION HALL, VIRGINIA.

LEVEL.

No. 920,718.    Specification of Letters Patent.    Patented May 4, 1909.

Application filed November 7, 1908. Serial No. 461,534.

*To all whom it may concern:*

Be it known that I, PETER J. BERNARD, a citizen of the United States, residing at Union Hall, in the county of Franklin and State of Virginia, have invented new and useful Improvements in Levels, of which the following is a specification.

This invention relates to a level of that type that consists of a weighted needle adapted to move around a graduated dial so that the device can be used as a plumb as well as a level and for measuring the angle of inclination of any object.

The invention has for one of its objects to improve the construction and operation of devices of this character so as to be comparatively simple and inexpensive to manufacture, and reliable and convenient in use.

Another object of the invention is the provision of a brake device or clutch for holding the needle in the position which it assumes when the device is used so that a reading can be taken at any time so that the user will not have to tax his memory in laying out a piece of work.

With these objects in view and others, as will appear as the description proceeds, the invention comprises the various novel features of construction and arrangement of parts which will be more fully described hereinafter and set forth with particularity in the claims appended hereto.

Figure 1:
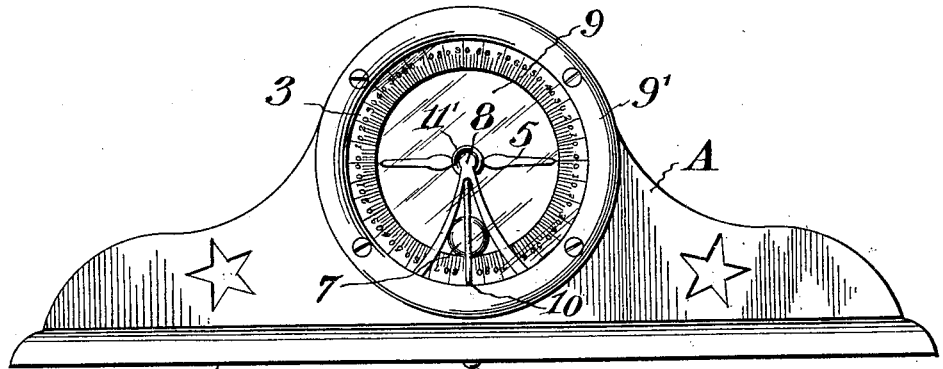
Figure 2:
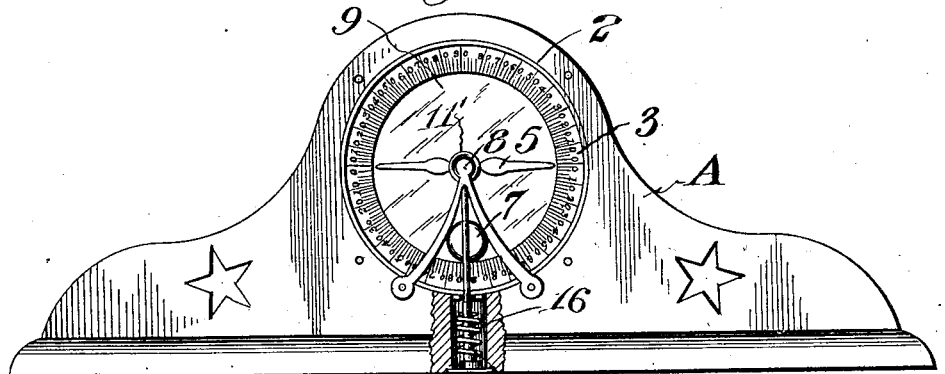
Figures 3, 4:
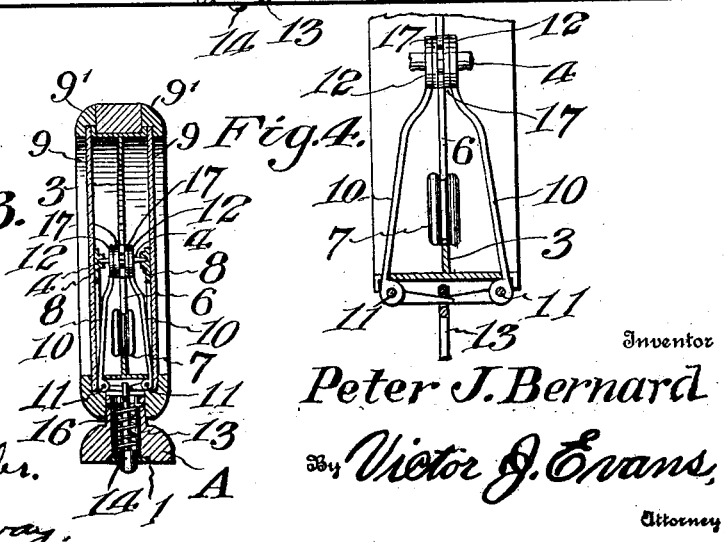

In the accompanying drawing, which illustrates one embodiment of the invention, Figure 1 is a front view of the device. Fig. 2 is a similar view with portions broken away. Fig. 3 is a central transverse section taken vertically through the device. Fig. 4 is a detail view of one of the brakes or clutches for the needle.

Similar reference characters are employed to designate corresponding parts throughout the views.

Referring to the drawing, A designates the stock of the device which has a flat face 1 which is adapted to be placed against the object to be leveled or trued and the stock has a central chamber 2 in which is arranged a central dial 3 in the form of a ring that is graduated into degrees. Arranged at the center of the dial is a shaft handle or axle 4 on which is mounted a central double-pointed needle 5 that moves within the dial 3, and extending at right angles to the needle and connected therewith is an arm 6 provided with a weight 7 whereby the needle gravitates to a horizontal position as the level is set in different positions for taking observation. The shaft 4 is journaled in bearing brackets 8 mounted within the chamber 2 of the stock. This chamber is closed at opposite sides by glass pieces 9 that are retained in place by rings 9', one of which rings is removed in Fig. 2.

The brake or clutch device for the needle consists of a pair of bell crank levers 10 that are fulcrumed in the stock at 11 and are provided at their inner ends with rings or eyes 12 through which the shaft 4 extends. The short arms of these levers are engaged in an opening in a push rod 13 that has a button 14 which slightly protrudes from the flat face 1 of the stock, and a helical spring 16 holds the push button in projected position and the rings or eyes 12 frictionally in contact with the needle. Since the button 14 slightly protrudes from the stock, it will be observed that the yokes will be released from the needle-carrying shaft by placing the flat face of the stock against any object to be trued or measured. The rings 12 are faced with leather, rubber or the like, as at 17, for gripping the needle at opposite sides.

In practice, the device is used for ascertaining the horizontal, vertical or inclined position of objects by placing the flat face of the stock against such object and noting the position of the needle with respect to the dial 3. In placing the stock against the object, the brake device is released so that the needle can freely swing under the effect of gravity acting on the weight 7, and when the object is horizontal, the points of the needle will be opposite the zero marks on the dial whereas a perpendicular position will be indicated by the needle pointing to the 90° marks. Any intermediate position can be ascertained by the position of the needle on the dial. As soon as the device is slightly tilted laterally on the object, the clutch device or brace will immediately set so as to hold the needle in the position it occupied when the observation was taken, so that a reading can be taken at any time until the device is used for another observation.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claims.

Having thus described the invention, what I claim is—

1. A device of the class described comprising a stock, a graduated dial thereon, a needle arranged to move around the dial, a gravity means for maintaining the needle in horizontal position, and means for automatically locking the needle in the position assumed when an observation is taken, said last-mentioned means including an element arranged to engage the work when positioning the device thereon for releasing the needle.

2. A device of the class described comprising a stock, a graduated dial thereon, a needle movable around the dial, a weight connected with the needle for holding the same in a horizontal position, an automatic clutch device for holding the needle in fixed position with respect to the dial, and means for automatically releasing the needle actuated by the work when the stock is placed against the same.

3. An apparatus of the class described having a chamber, an annular dial therein, a needle mounted to turn about the center of the dial, a shaft for the needle, means for mounting the shaft in the chamber, a friction device arranged to engage the needle for preventing movement thereof, and means arranged to automatically release the device by the placing of the stock against the work.

4. An apparatus of the class described comprising a stock, a dial thereon, a needle working over the dial, a weight connected with the needle, bell crank levers mounted on the stock and having brake devices for engaging the needle, and a spring-pressed push button for releasing the needle when the device is placed against the work.

In testimony whereof I affix my signature in presence of two witnesses.

PETER J. BERNARD.

Witnesses:
E. H. DUDLEY,
P. B. BOOTH.